3,775,392
PROCESS FOR POLYMERIZING
CONJUGATED DIENES
Tai Chun Cheng, Mogadore, and Adel F. Halasa, Bath, Ohio, assignors to The Firestone Tire & Rubber Company, Akron, Ohio
No Drawing. Continuation-in-part of application Ser. No. 854,272, Aug. 29, 1969. This application Sept. 7, 1971, Ser. No. 178,490
Int. Cl. C08d 1/20, 3/04, 3/06
U.S. Cl. 260—94.2 T     17 Claims

ABSTRACT OF THE DISCLOSURE

Conjugated dienes are polymerized by a new catalyst system which permits control of the molecular weight and gives a more easily processed product. This catalyst system comprises (1) a sodium hydrocarbon compound having 1–10 carbon atoms in which the hydrocarbon portion is a primary, secondary or tertiary alkyl radical, and (2) a potassium tertiary alkoxide of 4–10 carbon atoms. The diene polymers produced by this process have controllable molecular weights in the range of 25,000 to 1,000,000, preferably 100,000–500,000, broad molecular weight distribution, glass transition temperatures higher than normally obtained, high degree of branching and are more easily processed in the production of rubber and other compositions for commercial use.

This application is a continuation-in-part of application Ser. No. 854,272, filed Aug. 29, 1969, now abandoned.

BACKGROUND OF THE INVENTION

Field of the invention

This invention relates to a process for the polymerization of dienes using a catalyst composition comprising a sodium hydrocarbon compound and a potassium alkoxide.

Related prior art

The polymerization of conjugated dienes can be effected in a variety of methods. However, there are various disadvantages in the various methods presently known including undesirable or uncontrollable properties in the products, such as lack of control of molecular weight, molecular weight distribution and processability of the polymers. For example, the so-called "Alfin" catalyst system which has been studied extensively produces polybutadienes of approximately 5,000,000 molecular weight, or even higher, which are difficult to process for commercial use. This catalyst system generally comprises allyl sodium, sodium isopropoxide and sodium chloride. There are a number of literature references describing the Alfin process, typical of which is the review article in Rubber Age, vol. 94, October 1963, pp. 87–92.

This Alfin catalyst system effects very rapid formation of a very high molecular weight polymer having molecular weights of about 5,000,000 with about 75% of the polymer in the trans-1,4 configuration. In contrast, the polymerization by an alkyl sodium, such as amyl sodium, produces a much slower polymerization reaction to give a polymer having as high as 70% in the 1,2 configuration but with a molecular weight too low for the desired properties.

Polybutadienes prepared by the use of n-butyl lithium in n-hexane have about 8–10% 1,2; 53–54% trans-1,4 and 35–37% cis-1,4 configurations, which polymers do not have enough 1,2 configuration for the desired properties. By using polar modifiers or solvents, such as ethers, amines, etc., the vinyl content can be increased to up to 50–70%. However, the molecular weight distribution in such cases is so narrow as to give poor processability. Moreover, the polar modifiers act as chain terminators and prevent active polymer products that might be coupled or otherwise post-treated to improve processability. Processability is very important for commercial rubber tire production. Among other disadvantages poor processability results in poor adhesion to fillers and thereby gives poor reinforcement.

High glass transition temperatures in butadiene polymers generally indicate and accompany good wet traction. Butadiene emulsion polymers have low glass transition temperatures and have poor wet traction when fabricated into tires.

SUMMARY OF THE INVENTION

In accordance with the present invention, it has now been found that conjugated diene polymers of controllable molecular weight, broad molecular weight distribution, good processability, high glass transition temperatures and good wet traction are produced by the use of a catalyst system comprising the combination of (1) a sodium alkyl, and (2) a potassium tertiary alkoxide. A third component, namely a sodium halide, can be present in the catalyst system depending on the method used in preparing the sodium alkyl.

The hydrocarbon portion of the sodium hydrocarbon component has 1–10 carbon atoms, and even though larger groups can be used, there is no particular advantage. The hydrocarbon portion is alkyl, and the sodium can be attached to a primary, secondary or tertiary carbon atom.

These can be prepared by the reaction of metallic sodium with the corresponding halohydrocarbon. In cases where it is desired to prepare the sodium hydrocarbon free of the byproduct sodium halide, this can be done by adding a solution of sodium alkoxide, such as NaOt-Bu in cyclohexane, to a hexane solution of halide-free alkyl lithium. The resultant Na lkyl precipitates and, after filtering, the solid Na alkyl is washed under nitrogen with hexane to remove any lithium residues.

In addition to monosodium alkyl compounds, hydrocarbons having two sodium atoms attached can also be used, such as butane-1,4-disodium, pentane-1,4-disodium, etc. These compounds are prepared by the same methods as described above for preparing the monosodium compounds starting with dichloroalkanes or dilithioalkanes. However these compounds are not as practical as the monosodium compounds and the latter are therefore preferred. Nevertheless, the use of the disodium hydrocarbon compounds are considered as coming within the scope of this invention.

In the potassium alkoxide, it is important that the alkoxide is a tertiary alkoxide. The hydrocarbon portion of this alkoxide advantageously has 4–10 carbon atoms. While even larger groups can be used, there is no added advantage, and the resultant compounds are more sluggish in their activity.

The potassium alkoxide is prepared by the reaction of metallic potassium with a tertiary alcohol. This is advantageously prepared separately and excess potassium is used to insure that no unreacted alcohol remains to react with the sodium or sodium hydrocarbon upon mixture of the potassium alkoxide therewith. Some potassium alkoxides, such as t-butoxide, are available commercially.

In this catalyst combination, the system is most active when there are two moles of the potassium alkoxide per mole of the sodium hydrocarbon. If there is a mole per mole ratio, the catalyst is unsuitable, and if there is a considerable excess of the alkoxide over the 2–1 mole ratio, the catalyst is much less effective compared with the 2–1 optimum ratio. However, as the ratio decreases or increases from this optimum amount, there is some activity since there will be at least a portion of the sodium hydrocarbon associated with two moles of the alkoxide. Consequently, it is desirable to keep within the range of 1.5–2.5 moles of potassium alkoxide per mole of sodium hydrocarbon.

If a sodium halide is present, it is generally in the amount deposited by the reaction of sodium with the halohydrocarbon by which the sodium hydrocarbon is formed, so that generally there is a mole of sodium halide per mole of sodium hydrocarbon. The halide is generally the chloride or bromide, since these are more economical than the fluoride and iodide.

The catalyst can be prepared at room temperature, but preferably at 0° C. or even lower.

The effectiveness of the tertiary alkoxide as an active component in the present catalyst system is surprising, particularly in view of the teaching against the use of tertiary alkoxides in the Alfin catalyst system as reported in the last paragrauph on page 637 of Robert W. Lenz's book on "Organic Chemistry of Synthetic High Polymers," Interscience Publishers, New York (1969), where it is stated, in a discussion of Alfin catalyst systems, "Inactive catalysts are formed with alkoxides of n-propanol, t-pentanol, allyl alcohol and other non-secondary alcohols, . . . ." (Underscoring added.)

Typical sodium hydrocarbon compounds that can be used include compounds in which the hydrocarbon portion is methyl, ethyl, n-propyl, isopropyl, n-butyl, sec-butyl, t-butyl, n-amyl, sec.-amyl, t-amyl, n-hexyl, sec.-hexyl, t-hexyl, n-octyl, 1,1,5-trimethyl-pentyl, n-decyl, 1-methyl-2,4-diethyl-pentyl, phenyl, tolyl, ethylphenyl, naphthyl, methylnaphthyl, benzyl, phenethyl, etc.

Typical potassium tertiary alkoxides that are suitable include those in which the hydrocarbon portions are t-butyl, t-amyl (or 1,1-dimethyl-propyl), 1,1,4-trimethyl-pentyl, 1-methyl-1,4-diethyl-pentyl, 1-methyl-1-phenyl propyl, etc.

The catalyst is used in a proportion of 0.1 to 2 millimoles per 100 grams of monomer. The polymerization temperature is advantageously no higher than 40° C., and is preferably no higher than 30° C. While higher temperatures can be used, even as high as 70° C., the yield and molecular weight decrease when temperatures exceed 40° C.

Polybutadienes produced at temperatures of 40° C. or lower have molecular weights as high as 1,000,000, generally 100,000 to 500,00. Yields as high as 98–99% are easily produced. The 1,2-configuration in the polymer is at least 35% and generally in the range of 35 to 50%. I has been found that desirable wet traction or skid resistance properties require at least 35% 1,2 configuration in the polymers. In contrast corresponding emulsion polymers, which have low glass transition temperatures (−55 to −59° C.), also have poor wet traction properties. These polymers have 20–25% 1,2 configuration and 75–80% trans-1,4.

The polymerization is advantageously effected in the presence of an inert diluent to facilitate handling of the polymer and to give better temperature control. Normally liquid hydrocarbons are preferred for this purpose, such as benzene, toluene, saturated aliphatic hydrocarbons preferably of the straight chain variety, such as n-hexane, n-heptane, etc. However, where provision is made for external heat dissipation and temperature control, the solvent can be omitted.

The polymerization is advantageously conducted in a pressure vessel to avoid loss of monomer and solvent, particularly if temperatures are to be used at or above the boiling point of either. Advantageously the polymerization temperature is no higher than 40° C., since higher temperatures give progressively lower polymer yield, lower molecular weight and lower vinyl content with increase in temperature.

Conjugated dienes that may be polymerized, either alone or with each other, in accordance with this invention include: 1,3-butadiene, isoprene, chloroprene, 2-phenyl-1,3-butadiene, piperylene, etc.

Although butadiene homopolymers are preferred in the practice of this invention, butadiene copolymers can also be used where the comonomers impart desirable properties and do not detract from the polymer properties. The comonomers are preferably olefins, such as butene-1, n-butene-2, isobutylene, n-pentene-1, n-pentene-2 and the like, and also including vinyl aryl or isopropenyl aryl compounds or derivatives thereof having alkyl, aralkyl, cycloalkyl or chlorine attached to the aromatic nucleus, and preferably having no more than 20 carbon atoms. Typical of these aromatic comonomers are styrene, alpha-methyl styrene, vinyl toluene, isopropenyl toluene, ethyl styrene, p-cyclohexyl styrene, o-, m- and p-Cl-styrene, vinyl naphthalene, vinyl cyclohexyl naphthalene, vinyl methyl naphthalene, vinyl butyl naphthalene, isopropenyl naphthalene, isopropenyl isopropyl naphthalene, 1-vinyl-4-chloronaphthalene, 1 - isopropenyl-5-chloronaphthalene, vinyl diphenyl, vinyl diphenylethane, 4-vinyl-4′-methyl-diphenyl, 4-vinyl-4′-chlorodiphenyl, and the like. Preferably such comonomers have no more than 12 carbon atoms. Where such comonomers are to be used, generally at least 1%, preferably at least 5% by weight should be used and as much as 60%, preferably no more than 30% may be used.

In referring above to millimoles of catalyst this corresponds to the millimoles of sodium hydrocarbon since the catalyst is regarded or at least calculated as a complex of the potassium alkoxide and the sodium hydrocarbon.

SPECIFIC EMBODIMENTS OF INVENTION

The investion is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

To a 3-necked flask which is equipped with a high speed air stirrer, a nitrogen gas inlet, a Dry Ice reflux condenser and an external bath (maintained at −10° C.), there is added 800 ml. of dry hexane and then 53 ml. of a 40% dispersion of sodium in mineral oil (containing 20.6 gm. of metallic sodium). This slurry is cooled to −10° C. and 38.9 gm. of dry n-butyl chloride is added slowly with high speed agitation. After the addition of the n-butyl chloride, the reaction mixture is stirred continuously for about 60 minutes. At the end of this time 89.6 gm. of potassium t-butoxide is added. The resultant mixture is stirred for an additional 30 minutes at −10° C. then the temperature is raised gradually to room temperature and the slurry is transferred to a bottle in which a nitrogen atmosphere is maintained while the mixture is allowed to age for 1–2 weeks.

EXAMPLE II

By reversing the order of addition of the reagents in Example I it is possible to avoid the aging period required in Example I, and thus permit the use of the catalyst system immediately upon preparation. This is done by adding the 89.6 gm. of potassium t-butoxide to the suspension of sodium-mineral oil-hexane *prior* to the addition of the n-butyl chloride. After the KOtBu is added, the mixture is stirred and then the n-butyl chloride added gradually with the stirring continued for about 60 minutes after the n-butyl chloride addition is completed. The catalyst is then ready for use without any aging.

EXAMPLE III

To a moisture-free reactor which has been flushed with dry nitrogen, there is added 1,584 gms. of a hexane solution containing 365.9 gms. of butadiene. The solution is stirred for about 10 minutes at 30° C. and 5.592 millimoles of catalyst prepared as described in Example I or Example II is added with a hypodermic syringe under 50 lbs. of nitrogen pressure at 30° C. The system is immediately closed and the reactor rotated in a polymerization bath maintained at 30° C. After about 4 hours, a reddish polymer is obained. This is collected by pouring the mixture into a large amount of methanol and 20 ml. of anantioxidant, such as p-phenylenediamine. The polymer is dried and a polymer yield of 365.3 gms. or 98% of theoretical is obtained. The molecular weight of the polymer is approximately 500,000.

EXAMPLE IV

The procedure of Example III is repeated a number of times using in one case an Alfin catalyst prepared according to the procedure described by Hansley and Greenberg in Rubber Journal, 146, 42 (1964), and in other cases the procedure of Example III is repeated identically, in one case using the same temperature—namely 30° C.—and in other cases using temperatures of 50° and 70° C. respectively. Other conditions and results are tabulated below in Table I. As will be noted, the molecular weight of the Alfin-catalyzed polymer, as indicated by the high dilute solution viscosity (DSV), is much higher than for the polymer produced with the catalyst system of this invention. It will also be noted that, whereas the Alfin catalyst produces a polymer having 20% 1,2 configuration, the polymers produced by the catalyst system of this invention range from 37.8% to 47.7% of this configuration. It will also be noted that the higher temperatures cause a reduction in the molecular weight as evidenced by the DSV, and the percent of 1,2 microstructure is reduced somewhat. The yields are also reduced at the higher temperatures, and, therefore, it is generally desirable to use temperatures no higher than about 40° C.

TABLE I

| Catalyst | Temp., °C. | mMole catalyst/ 60 g. monomer | DSV | Percent gel | I.R., percent Cis-1,4 | Trans-1,4 | 1,2 |
|---|---|---|---|---|---|---|---|
| Alfin | 30 | 1.8 | 13.5 | 0 | 10 | 70 | 20 |
| nBuNa·KOtBu | 30 | 0.932 | 2.27 | 0.64 | 11.4 | 40.9 | 47.7 |
| nBuNa·KOtBu | 50 | 0.932 | 1.46 | 0 | 17.4 | 44.2 | 38.5 |
| nBuNa·KOtBu | 70 | 0.932 | 1.56 | 0 | 11.4 | 50.8 | 37.8 |

EXAMPLE V

Comparative tests are made on a polybutadiene prepared according to Example III and a butyl lithium-catalyzed polybutadiene of a type being used commercially for tire production. The polymer produced according to this invention shows a bulk viscosity almost three times as high as the commercial type butyl lithium-catalyzed polybutadiene. However the new polymer shows only slightly higher inherent viscosity measurements than for the commercial type. This information together with the respective molecular weight distribution determinations shows that the polymers of this invention are highly branched. Moreover, the overall processability characteristics of this polymer are better than the corresponding characteristics of the compared commercial type. When the respective polymers are blended respectively in a standard oil recipe and tested with standard laboratory traction devices, the new polymer of this invention registers about 21% improvement over the commercial type on the medium and high coefficient of friction surfaces. The composition with the new polymer has a faster cure rate, which results in a slightly higher modulus and tensile strength and a lower running temperature than the commercial type. The recipe used for the testing composition is: 100 (parts) polymer; 70 ISAF Black; 43 oil; 2.5 ZnO; 2.0 stearic acid; 1.0 Santoflex 13; 1.7 sulfur; 1.4 Cyclix B. This is cured for 30 minutes at 300° F. and gives the following test results:

| | Commercial type | New polymer |
|---|---|---|
| Stanley-London wet skid resistance index: | | |
| Surface CF 0.09 | 100 | 100 |
| Surface CF 0.39 | 91 | 113 |
| Surface CF 0.54 | 89 | 109 |
| Young's bending modulus (cured 30 minutes at 300° F.) Index.—At 10,000 p.s.i., ° C | −71 | −46 |

EXAMPLE VI

The procedures of Example I–III are repeated with similar results using equivalent amounts of other sodium alkyls as prepared from the following alkyl-halides:

(a) n-Butyl bromide
(b) t-amyl fluoride
(c) 2-chloro-n-pentane
(d) 2-chloro-2,5-dimethylhexane
(e) 2-iodo-n-hexane
(f) 1,4-dichlorobutane

EXAMPLE VII

The procedures of Examples I–III are repeated with similar results using in place of the potassium t-butoxide equivalent weights respectively of:

(a) Potassium t-amyloxide
(b) Potassium 2-oxy-2,5-dimethylhexane
(c) Potassium t-hexoxide

EXAMPLE VIII

The procedure of Examples I–III are repeated a number of times using in place of the butadiene an equivalent weight respectively of:

(a) Isoprene
(b) Chloroprene
(c) Piperylene
(d) 2-phenyl-1,3-butadiene
(e) 75–25 mixture of butadiene and styrene
(f) 70–30 mixture of butadiene and vinyl toluene
(g) 80–20 mixture of butadiene and n-butene-1
(h) 70–30 mixture of butadiene and isoprene
(i) 75–25 mixture of isoprene and n-hexene-1

The results are similar.

EXAMPLE IX

The procedures of Examples I–III are repeated with similar results using in place of the hexane an equivalent amount respectively of: benzene, toluene, n-octane, cyclohexane and methylcyclohexane.

EXAMPLE X

The procedures of Examples I and II are repeated using an equal amount of dry diethyl ether in place of the n-hexane. After the final stirring is completed and the solution allowed to come to room temperature, the precipitated sodium chloride is removed from the ether solution by filtration. Then 800 ml. of dry benzene is added and the ether removed by gradual and careful application of reduced pressure. The ether is recovered in a Dry Ice trap. When the initial amount of ether has been recovered, the distillation is stopped. The resultant catalyst suspensions are used with similar results in the procedures of Examples III, VI, VII and VIII.

EXAMPLE XI

The procedures of Examples I, II and III are repeated twice each, using in one series of the respective procedures potassium n-butoxide, and in the other series potassium sec.-butoxide in place of the tertiary butoxide. The resultant polymerizations are very ineffective giving low conversions (less than 40%) and low molecular weight products (less than 10,000).

EXAMPLE XII

A catalyst system free of halide is prepared as follows: To 600 ml. of a hexane solution containing one mole of halide-free n-BuLi there is added with stirring and under a nitrogen atmosphere 600 ml. of a cyclohexane solution containing one mole of Na t-amyloxide. The n-BuNa precipitate is filtered and washed under nitrogen several times with cyclohexane. This material upon analysis shows less than 1.44% Li being present.

A number of 28 oz. polymerization bottles are charged, after being flushed with nitrogen, with 60 gm. of butadiene in 260 gm. of hexane solution. The bottles are sealed with caps having an opening covered by a rubber liner covered on the inside with aluminum foil, and the bottle and its contents brought to a temperature of 30° C. Using the halide-free n-BuNa prepared as described above, or n-amyl Na similarly prepared, or the salt-containing Na alkyl as specified and prepared according to Example II, the respective catalyst combinations described below are injected as a hexane solution by a hypodermic syring inserted through the rubber liner in the sealing cap of the bottle. The bottles are placed in a polymerization bath maintained at 30° C. and rotated for four hours. (The specified metal alkoxides are available hailde-free commercially or may be prepared by addition of the stoichiometric amount of the appropriate alcohol to a mineral oil suspension of the finely divided metal.) The results are tabulated below in Tables II–III.

TABLE II

| Millimole per 60 g. of monomer (butadiene) | | | | |
|---|---|---|---|---|
| n-Bu Na, salt-free | n-Bu Na, with salt | KOtAm | Mol wt. | Percent conv. |
| 0.96 | | 1.92 | 75,000 | 100 |
| | 0.96 | 1.92 | 100,000 | 100 |

TABLE III

| Millimoles per 60 g. of monomer (butadiene) | | | |
|---|---|---|---|
| n-Am Na, with salt | KOn-Bu | Mol wt. | Percent conv. |
| 0.73 | 0.5 | <10,000 | 40 |
| 1.46 | 0.5 | <10,000 | 40 |
| 4.40 | 0.5 | <10,000 | 40 |
| 5.75 | 0.5 | <10,000 | 40 |

EXAMPLE XIII

The procedure of Example XII is repeated, using in each case NaOt-Am and NaOt-Bu respectively in place of the KOt-Am in the experiments reported in Table II so that the metal in each component is Na. As shown in the table below conversions of about 20% and molecular weights of less than 10,000 are obtained showing these catalyst combinations are very ineffective.

| mMoles | | | | | |
|---|---|---|---|---|---|
| NaOt-AM/ 60 g. monomer | NaOt-Bu/ 60 g. monomer | Na n-Bu, salt-free | Na n-Bu, with salt | Mol. wt. | Percent conv. |
| 1.92 | | 0.96 | | 10,000 | 20 |
| 1.92 | | | 0.96 | 10,000 | 20 |
| | 1.92 | 0.96 | | 10,000 | 20 |
| | 1.92 | | 0.96 | 10,000 | 20 |

The "dilute solution viscosity" (DSV) referred to above is defined as the inherent viscosity determined at 25° C. on a 0.4% solution of the polymer in toluene. It is calculated by dividing the natural logarithm of the relative viscosity by the percent concentration of the solution, i.e., it is the inherent viscosity measured at 0.4% concentration. The molecular weights reported herein are determined from these viscosities.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A process for the hydrocarbon solution polymerization of a monmer composition containing at least 70 percent conjugated diene to a polymer having a molecular weight about 25,000 to 1,000,000 and having at least 35 percent of the butadiene therein in the 1,2-configuration comprising the steps of maintaining said monomer composition at a temperature of no more than 70° C. in intimate contact with a catalyst composition consisting essentially of:

(a) a sodium hydrocarbon having 1–10 carbon atoms therein selected from the class consisting of sodium alkyls; and (b) a potassium tertiary alkoxide of no more than 10 carbon atoms, the concentration of said catalyst composition being 0.1–2 millimoles of catalyst per 100 grams of said monomer composition, and said potassium alkoxide being present in said catalyst composition in a ratio of 1.5–2.5 moles per mole of sodium hydrocarbon, said polymerization being conducted for a period of at least one hour.

2. The process of claim 1 in which said temperature is no more than 30° C.

3. The process of claim 2 in which said conjugated diene is 1,3-butadiene.

4. The process of claim 2 in which said monomer composition is essentially all 1,3-butadiene.

5. The process of claim 4 in which said sodium hydrocarbon is sodium n-butyl.

6. The process of claim 4 in which said polymerization is conducted for at least 10 hours.

7. The process of claim 4 in which said potassium alkoxide is potassium tertiray-butoxide.

8. The process of claim 7 in which said sodium hydrocarbon is sodium n-butyl.

9. The process of claim 8 in which said ratio of potassium alkoxide to sodium hydrocarbon is approximately two.

10. The process of claim 9 in which said polymerization is conducted in n-hexane solution.

11. The process of claim 10 in which said monomer is in n-hexane solution at a concentration of 10–25 percent by weight.

12. The process of claim 1 in which said catalyst composition is present at a concentration of 0.3–1.0 millimoles per 100 grams of said monomer.

13. The process of claim 1 in which said monomer composition is dissolved in a liquid hydrocarbon having a boiling point no higher than 110° C.

14. The process of claim 13 in which said monomer composition is present at a concentration of 10–25 percent by weight.

15. The process of claim 14 in which said liquid hydrocarbon is n-hexane.

16. The process of claim 1 in which said monomer composition comprises 70–95% by weight of 1,3-butadiene and 5–30% by weight of styrene.

17. The process of claim 16 in which said alkoxide is a potassium tertiary-alkoxide.

(References on following page)

References Cited

UNITED STATES PATENTS

| | | | |
|---|---|---|---|
| 3,265,680 | 8/1966 | Forman et al. | 260—94.2 |
| 3,265,758 | 8/1966 | Aldman et al. | 260—94.2 X |
| 3,294,768 | 12/1966 | Wofford | 260—83.7 |
| 3,324,191 | 6/1967 | Wofford | 260—669 |
| 3,331,821 | 7/1967 | Strobel | 260—83.7 |
| 3,380,984 | 4/1968 | Birchall et al. | 260—94.2 |

FOREIGN PATENTS

| | | | |
|---|---|---|---|
| 782,970 | 1957 | Great Britain | 260—94.2 |

OTHER REFERENCES

"Alfin Catalysts" by Morton, Encyclopedia of Polymer Science and Technology, pp. 629–637, Interscience.

JAMES A. SEIDLECK, Primary Examiner

W. F. HAMROCK, Assistant Examiner

U.S. Cl. X.R.

260—85.3 R, 94.2 T; 252—431 R

UNITED STATES PATENT OFFICE
CERTIFICATE OF CORRECTION

Patent No. 3,775,392          Dated November 27, 1973

Inventor(s) Tai Chun Cheng and Adel Farhan Halasa

It is certified that error appears in the above-identified patent and that said Letters Patent are hereby corrected as shown below:

In Column 2, Line 38, "lkyl" should be --alkyl--.

In Column 3, Line 19, "paragrauph" should be --paragraph--.

In Column 3, Line 49, "I" should be --It--.

In Column 7, Line 33, "hailde-" should be --halide- --.

In Column 8, Line 48 (Claim 7), "tertiray" should be --tertiary--.

Signed and sealed this 4th day of June 1974.

(SEAL)
Attest:

EDWARD M. FLETCHER, JR.
Attesting Officer

C. MARSHALL DANN
Commissioner of Patents